Figure 1:
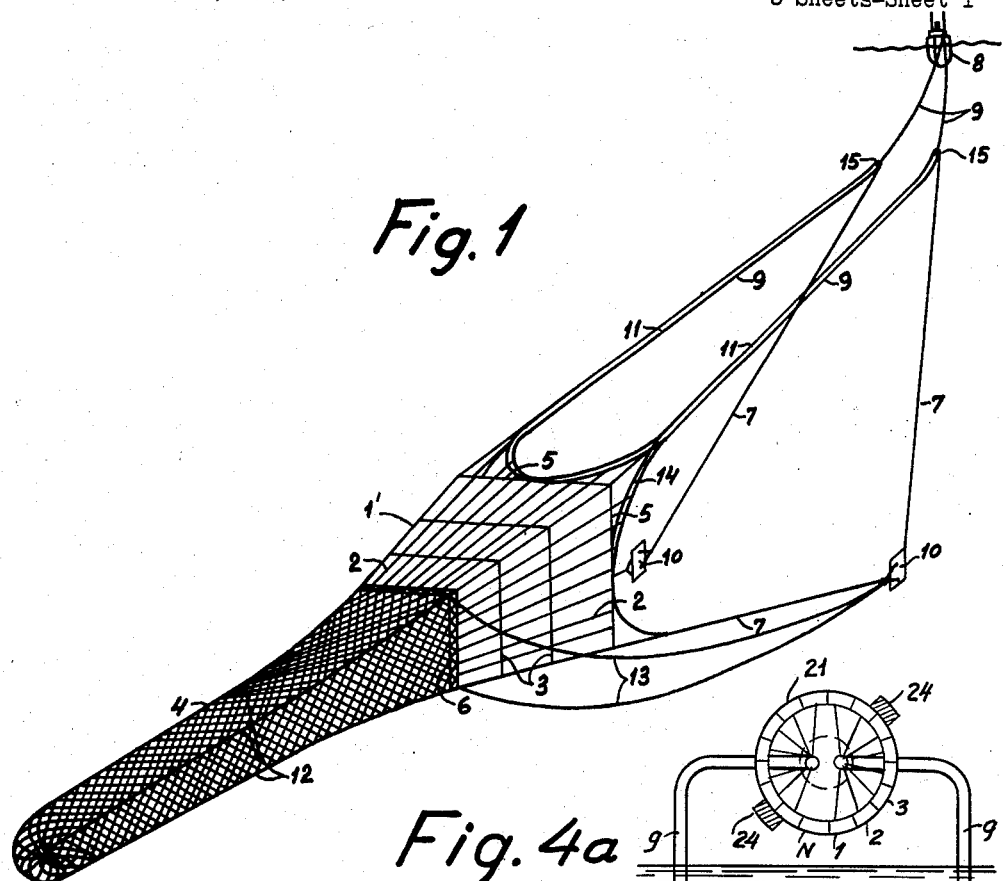

Sept. 15, 1959  J. GUDJOHNSEN ET AL  2,903,813
FISHING IMPLEMENTS
Filed June 25, 1956  3 Sheets-Sheet 1

INVENTOR.
JAKOB GUDJOHNSEN
HALLDOR GUDJOHNSEN
BY Cameron, Kerkam & Sutton
ATTORNEYS Sept. 15, 1959   J. GUDJOHNSEN ET AL   2,903,813
FISHING IMPLEMENTS
Filed June 25, 1956   3 Sheets-Sheet 2

*INVENTOR.*
JAKOB GUDJOHNSEN
HALLDOR GUDJOHNSEN
BY Cameron, Kerkam + Sutton
ATTORNEYS Sept. 15, 1959    J. GUDJOHNSEN ET AL    2,903,813
FISHING IMPLEMENTS

INVENTOR.
JAKOB GUDJOHNSEN
HALLDOR GUDJOHNSEN

United States Patent Office 2,903,813
Patented Sept. 15, 1959

2,903,813

FISHING IMPLEMENTS

Jakob Gudjohnsen, Reykjavik, Iceland, and Halldor Gudjohnsen, Tyboron, Denmark

Application June 25, 1956, Serial No. 593,756

Claims priority, application Denmark July 2, 1955

4 Claims. (Cl. 43—9)

The invention relates to an installation in electric sea fishery, and consists of a trawl with fine meshed, bag-shaped back part and a front part diverging in the direction of towing, with electrodes connected through cables to an electric generator installed on a vessel.

The main object of the invention is to so arrange the implement that a considerable reduction in the resistance due to movement through the water is obtained, and thereby an improved running economy, while at the same time the trawl is made selective for fish of different sizes.

Furthermore, according to the invention the fishing implement provides the advantages further described below in comparison with known fishing implements of a similar nature and overcomes various disadvantages of the trawls as known up to present.

The known trawls are constructed as a net with such small meshes that those fish coming into contact with the trawl do not remain hanging in the meshes, as this would render the work of sweeping difficult and decrease the possibilities for the catch with respect to the larger and more valuable fish.

The employment of small mesh dimensions in the trawl net brings about two disadvantages:

In the first case a trawl with small meshes offers a considerable resistance to movement through the water, which in turn means a lower sweeping speed and thereby decreased catch possibilities, while at the same time the sweeping time and thus the catch time itself are increased.

In the second case considerable amounts of small fish and fry are caught in a trawl with small meshes, which among other things has led to the fishing nations of the North Atlantic seaboard agreeing to establish a minimum mesh size and thereby protect the fish stock.

According to the present invention a fishing implement has been achieved consisting of a trawl, by means of which the disadvantages mentioned with respect to the small mesh size are remedied, in that according to the invention it has been made possible to construct the front part of the trawl with considerably greater mesh size than has hitherto been possible, whereby the sweep resistance is decreased to a considerable degree, while at the same time there is achieved the selective action of the sorting out of the fish below a certain predetermined size, as is described below.

According to the invention the fishing implement is characterized by the fact that the electrodes of the front part consist of conductors which are held together at a mutual distance by means of electrically non-conducting transverse connections and together with these form a net with greater mesh size than the mesh size in the back part of the trawl, and by the fact that the conductors through multi-conductor cables are connected to a current distributor supplied by an A.C. generator and successively, in pairs are supplied with brief A.C. impulses.

The principal advantage obtained by this invention lies in the use of the concentration of an electrical field around relatively thin conductors, which offer little resistance to the towing through the water, to scare fish toward the bag of the trawl.

The further details and particularizations of the invention will be described below in connection with the drawing, where—

Figure 4A:
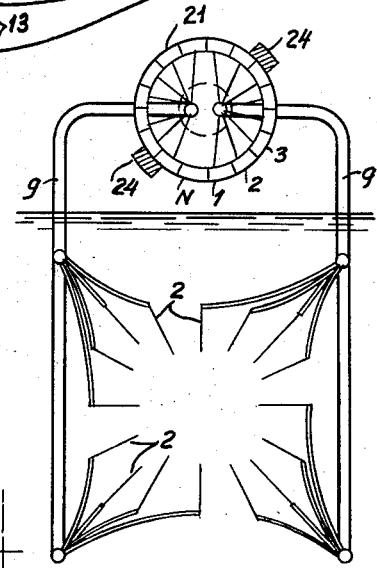
Figure 3:
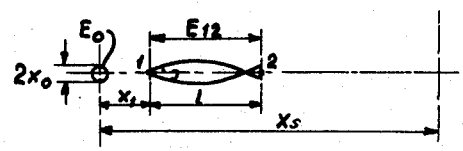
Figure 2:
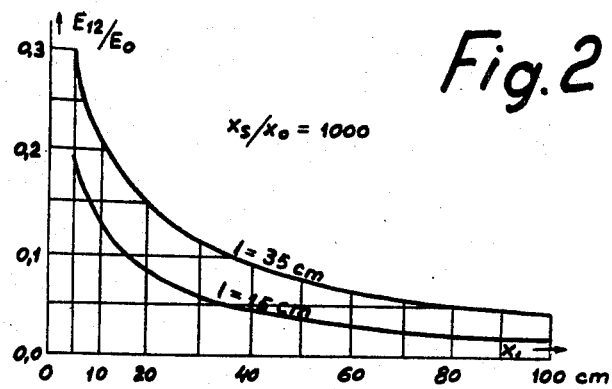
Figure 4:
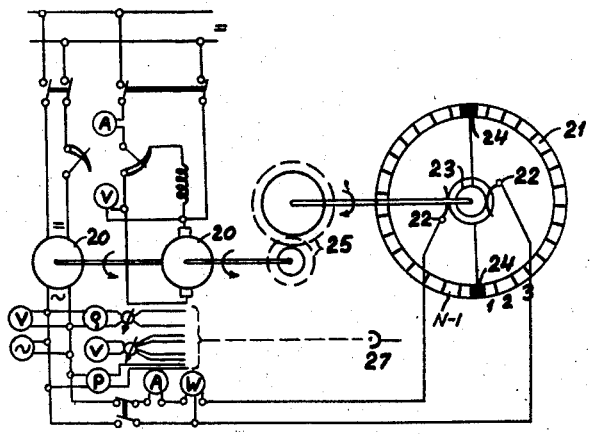
Figure 5:
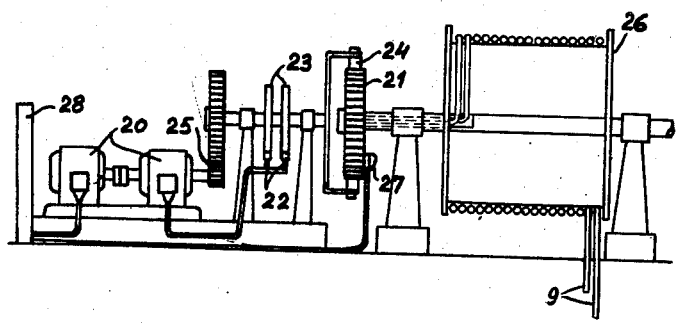
Figure 6:
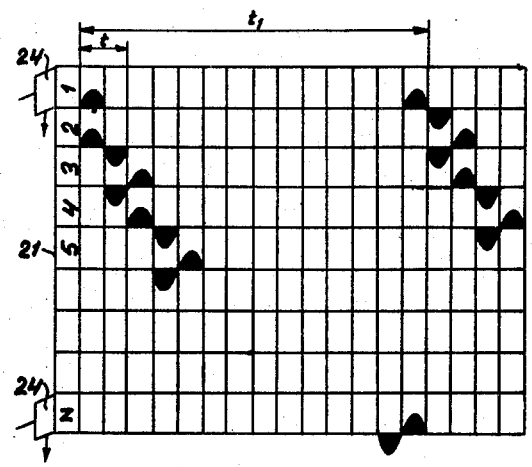

Fig. 1 shows a form of construction for the fishing implement according to the invention, seen in perspective, Fig. 2 is a diagram showing the ratio between the voltage with which a fish is affected and the potential of the conductor or electrodes, as a function of the distance of the fish from the conductor or electrodes, Fig. 3 is a diagrammatic showing employing the reference characters of Fig. 2 showing the approach of a fish to an energised conductor or electrode, Fig. 4 is a circuit diagram of an impulse generator appertaining to the fishing implement, Fig. 4a shows a schematic electric circuit from the current distributor of the impulse generator to the electrical conductors or electrodes in the front part of the trawl, those conductors or electrodes shown in heavy lines denoting the conductors or electrodes momentarily energized and corresponding to the position shown for the current distributor brushes, Fig. 5 shows schematically the mechanical construction of the impulse generator, seen from the side, and Fig. 6 shows a lay-out of the current distributor of the impulse generator.

The electrical trawl shown in perspective in Fig. 1 is constructed as a floating trawl and has a front part 1′, consisting of electrical conductors or electrodes 2, which receive an electrical potential, so that an electrical field of sufficient strength is produced around the conductors or electrodes to chase away those fish which approach the conductors or electrodes, with the result that they come into the back part of the trawl 4 during the trawl sweep. The conductors or electrodes 2 are fastened in front to a hawser 5 in the forward opening of the trawl and lying at right angles to the conductors or electrodes, and at the back to another hawser 6, which terminates the electrical part of the trawl. The conductors or electrodes 2 are held at the mutually correct distance by means of hawsers 3, which are fastened at suitable intervals along the conductors or electrodes and at right angles to these. The back part of the trawl 4 is constructed of a close meshed net as in an ordinary trawl.

The trawl is swept by a fishing vessel 8 with the aid of two sweeping hawsers 9, which are made fast to hawsers 11, which lead to the upper part of the trawl, and by sweeping hawsers 7 via the vanes 10 to the lowest part of the trawl. Sweeping hawsers 7 and 11 are fixed to four hawsers 12, which form the edges of the back part of the trawl. Sweeping hawsers 9 are constructed as multiconductor cable, the conductors of which branch off along parallel hawsers 14, and are in direct connection with the electrical conductors or electrodes 2 in the front part of the trawl.

The sweeping hawsers 9 are armoured with two sets of armoured wire, as a protection against wear, and which is intended to transfer the pull from the trawl via a clamping arrangement 15 to hawsers 7 and 11. Hawser 13 to the back part of the trawl is used when the fish have to be brought aboard the fishing vessel.

It is assumed that the current for the impulse generator is obtained from the electrical supplies of the fishing vessel. As impulse generator a motor-generator is used, i.e., a D.C. shunt motor, directly coupled to a single phase synchronous generator (alternator), which transfers the electrical energy to a stationary commutator-like current distributor 21, each lamella of which, shown at 1 to N in Figs. 4 and 6, is connected to a corresponding multi-conductor in the multiconductor cables or hawsers 9.

As shown in the circuit diagram the current from a motor-generator 20 is led to a current distributor 21 via two slipring brushes 22, sliprings 23 and current distributor brushes 24. The sliprings 23 and the brushes 24 are rotated from a gear system 25, which is directly coupled to the motor-generator 20.

As shown in Fig. 5, the current distributor 21 is placed on the hollow axle of a winding drum 26. The ends of the sweeping cables 9 are led through the hollow axle to the current distributor, where the cable conductors are fastened each to its lamella, so that diametrically opposed current distributing brushes connect diametrically opposed conductors in the trawl. The measuring and signal conductors in the trawl are connected via a plug and socket 27 to the meters on a current panel 28.

In Fig. 6 the column at the extreme left shows the lamellae 1 to N of current distributor 21. The solid black element shown in the column to the right of the lamellae of the current distributor indicates the electrical impulses of sine wave form, generated in the motor generator 20 and distributed to the conductors of the cables 9, each conductor being connected to one lamella of the current distributor 21. The width of the current distributing brushes 24 is somewhat less than or equal to the width of each lamella, so that only two pair of conductors get current simultaneously. In the brief instant where the brushes only cover one lamella, the generator load will go down to below the half of that load which two conductors or electrodes per brush would bring about. In order to avoid such variations in load, the position of the brushes 24 in relation to the position of the synchronous generator 20's armature is coordinated in such a way that the current goes through its zero value at that moment the brush only covers one lamella, and the gear system 25 is so adjusted that a half wave covers that period it takes for the brush to traverse one current distributing lamella. Thus each conductor or electrode gets voltage for $t$ seconds with a positive and a negative half wave, and the other conductors or electrodes in succession get the same voltage impulses.

The time interval $t_1$ between voltage impulses in a given conductor or electrodes is determined by the time it takes for a brush to run through half the number of lamellae in the current distributor. The diagram of Fig. 2 shows the ratio ($E_{12}/E_0$) between a voltage difference $E_{12}$ with which a fish is affected, and a conductor (electrode) potential of $E_0$, as it depends on the distance $X_1$ between the conductor (electrode) and the nose of the fish, it being assumed that the fish approaches the conductor (electrode) in a plane which is at right angles to the conductor (electrode), Fig. 3. The ratio values 0.1 to 0.3 are represented by ordinates in Fig. 2. The diagram shows that a short fish is exposed to a smaller value ($E_{12}/E_0$) at a definite distance $X_1$, than a long fish, $l$ represents the length in cm. of the fish shown in Fig. 3, $X_s$ represents half the distance between an electrode and its counter electrode and $X_0$ represents the radius of the electrode of circular cross section shown in Fig. 3. The diagram in Fig. 2 is based on a definite value of $X_s/X_0=1000$ and the curves drawn are in respect of two different lengths of fish, viz.: $l=15$ cm. and $l=35$ cm. Since short fish are exposed to a smaller potential difference than a longer fish at a given distance from an electrode and since the electrodes form a mesh of greater size than in the rest of the trawl, short fish can pass between the electrodes without being effected by the electrical field.

The diagram also shows that for a definite value of the potential $E_0$ a short fish is exposed to a lower potential difference than a long fish, while a short fish is affected by a definite value of the potential difference $E_{12}$ at a much shorter distance from the conductor or electrodes than a long fish.

To be able to "hedge in" a fish affectively with the conductors or electrodes it is necessary that the electrified region has a definite minimum extent, so that the fish is exposed to a definite number of electrical impulses, increasing in strength, as the fish nears the conductors or electrodes. The electrical fence formed by the conductors has thus a selective effect on the fish, depending on the length of these. As the electrical field used consists of positive and negative field impulses, the fish is not attracted by the conductors, but tries to set itself parallel to these in an equipotential surface.

It is generally known that a fish exposed to a potential difference behaves differently in a D.C. field and an A.C. field. In a D.C. field it sets itself parallel to the lines of force, and with increasing intensity of field it will by degrees undergo three stages, characterized by 1st stage—muscle contractions
2nd stage—it swims in the direction of increasing field strength, the so-called electrohypnosis, and
3rd stage—it lies on its side without being able to swim, the so-called electronarcosis.

In an A.C. field the fish will, on the other hand, position itself according to an equipotential surface, i.e., a surface at right angles to the direction of the lines of force.

Experiments have shown that the potential difference necessary in order to obtain the 3rd stage effects is constant for each fish species, and independent of the length of the fish, varying from 1 to 4 volts for the different species. Experiments have further shown that the potential difference necessary to produce stages 1 and 2 amounts respectively to 6% and approx. 60% of the 3rd stage potential difference. If one therefore uses A.C. to produce a potential difference which is necessary to give 1st stage effects, the affected fish will escape from the electrical conductors or electrodes and swim away from them by its own power.

As a result of this, the field strength is so adjusted, that the fish is exposed to the potential difference necessary to obtain the 1st stage effect, at the outer limit of the field, where its swimming powers are not reduced, so that it can swim away from the conductors or electrodes under its own power. At a distance from the conductors or electrodes which is greater than the outer limit, the fish will not be affected by the field, and it will then not be encouraged to swim away and save itself through the front opening of the trawl.

When, as above mentioned, the low field strength is employed, the advantage is gained that the electric current in the conductors or electrodes is weak in strength, so that it can be supplied from the fishing vessel without heavy conductors being used, in that the depth at which the trawl can be used is obviously limited by the thickness and length of the feed cable. The conditions stated regarding the conductors' potentials refer to their ends at the back part of the trawl.

As the conductors converge from the front opening of the electric trawl to its back part, the distance between the conductors or electrodes in the forward opening is increased in the same proportion. The potential in the front ends of the conductors or electrodes is also higher on account of the unavoidable fall in potential in the conductors or electrodes. By a correct choice of conductor cross section it is possible to so adjust the voltage drop, that the same potential difference at a definite distance from the conductors or electrodes along the whole of their length can be obtained. It is therefore possible to fence-in a fish of a definite length which finds itself within a fenced-in area, and which will therefore come into the back part of the trawl under its sweeping provided that it has not been able to escape from the forward opening of the trawl.

The trawl could be swept by two fishing vessels as well as by one, just as two generators could be used to supply current to the trawl. Furthermore, a combination of electrical conductors or electrodes and net meshes could be used in the front part of the trawl, and floats and counterweights are naturally used where necessary.

We claim:

1. In apparatus for electrical salt water fishing, a trawl comprising a meshed bag-shaped back part, a front part diverging in the direction of towing, said front part consisting of equally spaced flexible electrodes disposed along the length thereof, a ship-borne electric A.C. pulse generator, two multiconductor cables connecting said pulse generator to said flexible electrodes, each conductor of said multiconductor cables being connected to a corresponding one of said flexible electrodes whereby the A.C. pulses pass through the water from one pair of said conductors to another pair disposed on the opposite side of said front part, the A.C. pulses being transferred in succession to all of said flexible electrodes, and each A.C. pulse causing a voltage difference in the immediate vicinity of said electrodes of a magnitude capable of diverting approaching fish therefrom.

2. In apparatus for electrical salt water fishing, a trawl comprising a meshed bag-shaped back part, a front part diverging in the direction of towing, said front part consisting of equally spaced flexible electrodes disposed along the length of said front part, two multiconductor cables connected to said flexible electrodes, each conductor of said multiconductor cables being connected to a corresponding one of said flexible electrodes, an electric A.C. pulse generating plant including a motor-driven A.C. generator, a set of slip-ring brushes, a stationary commutator-like current distributor, brushes for said distributor, and lamellae for said distributor equal in number to the number of said conductors of said multiconductor cables, said A.C. generator being connected to said slipring brushes, said slipring brushes being connected to said distributor brushes, said distributor brushes rotating over said lamellae at a speed to energize with full wave pulses of opposite polarities two pairs of oppositely disposed lamellae of said current distributor, one lamellae being of a width equal to or larger than the width of a distributor brush, the voltage level of said full wave pulse generated in said A.C. generator causing a voltage difference in the immediate vicinity of said flexible electrodes of a magnitude capable of diverting approaching fish therefrom.

3. Apparatus as described in claim 2 including gearing driven by said generator and rotating said distributor brushes.

4. Apparatus as described in claim 2 including a winding drum, and a hollow axle for said winding drum, said multiconductor cables passing through said hollow axle.

References Cited in the file of this patent

FOREIGN PATENTS 699,346     Great Britain _____ Nov. 4, 1953